No. 683,549. Patented Oct. 1, 1901.
S. BRENTNALL.
DRESSING TABLE.
(Application filed Mar. 5, 1901.)
(No Model.) 2 Sheets—Sheet 1.
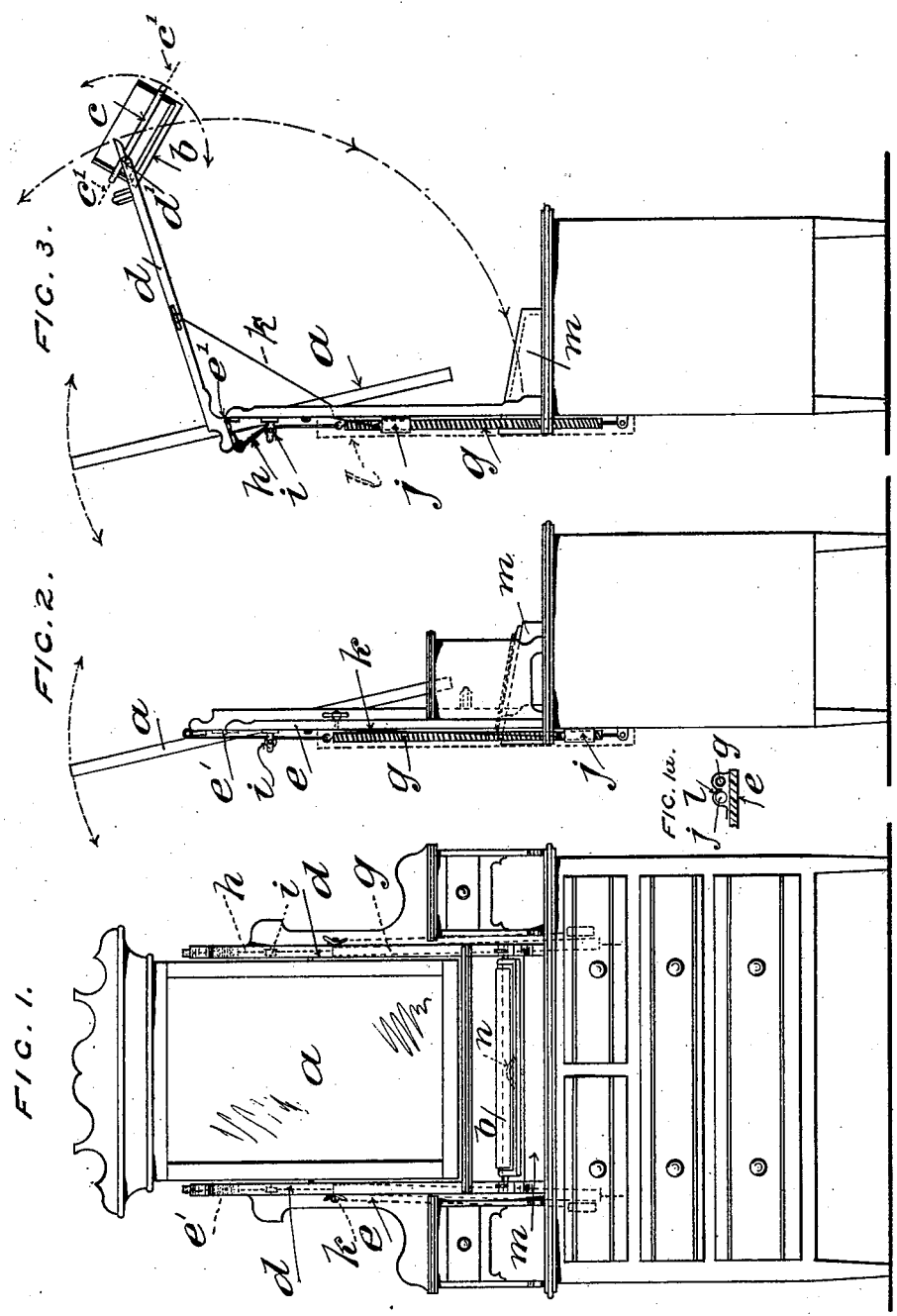
WITNESSES.
INVENTOR.
Samuel Brentnall,
By his Attorneys

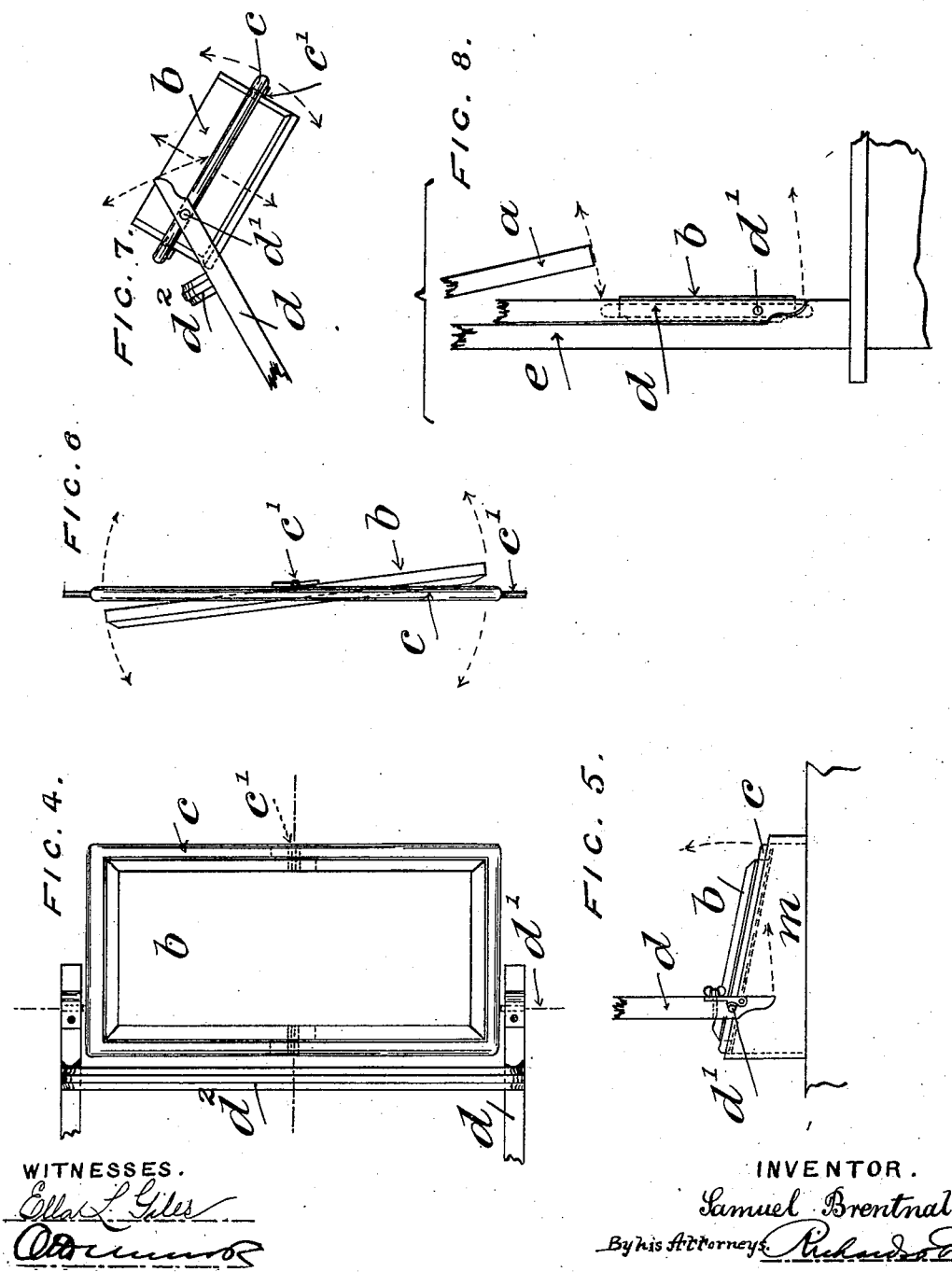

UNITED STATES PATENT OFFICE.

SAMUEL BRENTNALL, OF MANCHESTER, ENGLAND.

DRESSING-TABLE.

SPECIFICATION forming part of Letters Patent No. 683,549, dated October 1, 1901.

Application filed March 5, 1901. Serial No. 49,914. (No model.)

*To all whom it may concern:*

Be it known that I, SAMUEL BRENTNALL, manufacturer, a subject of the King of Great Britain and Ireland, residing at 157 Lloyd street, Greenheys, Manchester, in the county of Lancaster, England, have invented certain new and useful Improvements in and Relating to Dressing-Tables and the Like, (for which I have made application in Great Britain No. 1,622 and dated January 24, 1901,) of which the following is a specification.

My said invention has reference to dressing-tables, wardrobes, and the like, provided with mirrors which reflect the image of the user. The mirrors of these dressing-tables, &c., only give a single reflection, so that a lady arranging her hair has frequent resort to a hand-glass, both hands being rarely at liberty for the task of arranging the hair. The result is that much straining of the eyes occurs in dealing with the hair, and the task is rarely performed to the lady's satisfaction.

The object of my invention is to increase the utility of such dressing-tables by the combination therewith of an additional mirror, which is so carried and disposed as that a second image or reflection is obtained, thus enabling a lady to obtain a full view of the back of her head and yet leave both hands free to deal with her hair.

My invention will be clearly understood from the following detailed description, in which reference is made to the annexed two sheets of drawings.

In the said drawings, Figure 1 is a front elevation of a form of dressing-table with my improved additional reflecting-mirror applied thereto, the additional mirror being shown in the position it occupies when out of use. Fig. 1ª is a detail view. Fig. 2 shows an end elevation of Fig. 1. Fig. 3 is an end elevation of Fig. 1, but with the secondary mirror raised and in a position for use for giving the required additional reflection. Fig. 4 is a plan view of the additional hinged and pivoted mirror or reflector. Fig. 5 shows the said mirror as when out of use and constituting the lid of a jewel-box. Fig. 6 is an edge view of the additional mirror and frame. Figs. 7 and 8 show a modification of my invention in which the additional or secondary mirror when out of use folds vertically away below the usual or primary mirror.

In carrying my invention into effect in conjunction with the usual hinged mirror or looking-glass $a$ I employ an additional or secondary mirror or reflector $b$ of a suitable size and shape. This additional or secondary mirror $b$ is preferably pivoted within a frame $c$ upon pivot-pins or the like $c'$ $c'$, so that the dip of the mirror $b$ within the said frame may be adjusted. The frame $c$ is pivoted at the points $d'$ $d'$ to supporting-arms $d$ $d$, which are in turn hinged or centered at $e'$ $e'$ to the usual vertical arms $e$, which support the ordinary hinged mirror $a$. The hinged arms $d$ $d$, which carry the secondary glass $b$, are raised and sustained by means of springs $g$ $g$, the connection between the springs and arms being made by cords or the like $h$ $h$, which pass over pulleys $i$ $i$. In order to impart rigidity to the movable arms $d$ $d$, I propose to employ cross-stays $d^2$. To act as a counterpoise to the spring $h$ $h$, weights $j$ $j$, connected by cords $k$ $k$ to the movable arms $d$ $d$, may be employed. In such a case the length of the cords $k$ $k$ limits the upward movement of the arms $d$ $d$. If desired, the spring and weight may be inclosed in sheaths or casings $l$ $l$, as is clearly indicated in Fig. 1ª.

The working of my improved arrangement is as follows: When the additional or secondary mirror $b$ is out of use, the arms $d$ $d$, which carry the same, fold against the back of the dressing-table, carrying downward the secondary mirror, which is turned so as to lie flush within the frame $c$. The frame $c$ and mirror $b$ when the arms $d$ $d$ are lowered are turned on the pivots $d'$ $d'$ in such a manner that the frame $c$ and mirror $b$ constitute the lid of a jewel-box, such as $m$, which may be formed with or secured to the dressing-table top. The disposition of the parts when folded and out of use is clearly shown in Figs. 1, 2, and 5. The frame $c$ or mirror $b$ may be formed with a suitable handle $n$, and locking means may also be provided. To raise the secondary mirror $b$, the user draws the same slightly forward and clear of the jewel-box $m$, whereupon the springs $g$ $g$ elevate the arms and sustained mirror. With the secondary mirror raised to the required elevation the user next manipulates both glasses *a* and *b* to the required angle or angles and disposes herself so that the head occupies a suitable position— say intermediate between the two mirrors— whereupon the additional required reflection of the back of the head can be obtained. By mounting the mirror *b* within a frame it will be observed that a double movement for the mirror results, which permits of a better and wider range of reflection being obtained. In some cases a single pivot movement for the glass *b* might suffice.

The hinged arms *d* and the parts which support such hinged arms may in some cases be made from metal instead of wood.

As a modification of my invention the additional pivoted mirror *b* may fold away vertically below the usual mirror *a*. This arrangement is clearly shown in Figs. 7 and 8, Fig. 7 showing the additional mirror *b* in use, and Fig. 8 the position of the said mirror when folded back and out of use.

In some cases I may arrange for the secondary glass to be adjustable upon the carrying-arms, so that its distance from the usual mirror may be varied.

I declare that what I claim is—

The combination with a dressing-table or the like, of a main mirror, hinged arms located at opposite sides thereof, a box or receptacle on said table, and a supplemental mirror carried by said arms, said supplemental mirror and box being equidistant from the axis of the arms whereby when the arms are swung downward the supplemental mirror serves as a cover to said box, substantially as described.

In witness whereof I have hereunto set my hand in presence of two witnesses.

SAMUEL BRENTNALL.

Witnesses:
RICHARD IBBERSON,
ALFRED YATES.